United States Patent
Takagi et al.

(10) Patent No.: US 8,356,798 B2
(45) Date of Patent: Jan. 22, 2013

(54) METHOD FOR MANUFACTURING AGGREGATED RESIN PARTICLES

(75) Inventors: Seiichi Takagi, Kanagawa (JP); Hiroyuki Moriya, Kanagawa (JP); Hideya Katsuhara, Kanagawa (JP); Tomohito Nakajima, Kanagawa (JP); Takashi Imai, Kanagawa (JP); Shingo Ishimaru, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/394,702

(22) Filed: Feb. 27, 2009

(65) Prior Publication Data
US 2010/0052204 A1 Mar. 4, 2010

(30) Foreign Application Priority Data
Mar. 3, 2008 (JP) ................................. 2008-052481

(51) Int. Cl.
*D04H 1/16* (2006.01)
(52) U.S. Cl. ........................................ 254/113; 264/109
(58) Field of Classification Search .................. 264/109, 264/113
See application file for complete search history.

(56) References Cited

U.S. PATENT DOCUMENTS

| | | | | |
|---|---|---|---|---|
| 6,887,638 B2 * | 5/2005 | Ishiyama et al. | ............ | 430/110.2 |
| 7,528,182 B2 * | 5/2009 | Teshima et al. | ................ | 523/313 |
| 2005/0178727 A1 * | 8/2005 | Takagi et al. | ................ | 210/634 |
| 2005/0223847 A1 * | 10/2005 | Shiraishi et al. | ................ | 75/348 |
| 2006/0057485 A1 | 3/2006 | Teshima et al. | | |
| 2006/0210909 A1 | 9/2006 | Ohtani | | |
| 2008/0029924 A1 | 2/2008 | Maezawa et al. | | |

FOREIGN PATENT DOCUMENTS

| | | |
|---|---|---|
| CN | 101118393 A | 2/2008 |
| JP | A-11-2922 | 1/1999 |
| JP | A-11-2923 | 1/1999 |
| JP | 2002160907 A * | 6/2002 |
| JP | A-2006-293320 | 10/2006 |
| JP | A-2007-117883 | 5/2007 |

OTHER PUBLICATIONS

Nov. 2, 2011 Chinese Office Action issued in Chinese Patent Application No. 200910126355.4 (with translation).
Aug. 30, 2012 Korean Office Action issued in Application No. 10-2009-0017860 (with English translation).

* cited by examiner

*Primary Examiner* — Yogendra Gupta
*Assistant Examiner* — Amjad Abraham
(74) *Attorney, Agent, or Firm* — Oliff & Berridge, PLC

(57) ABSTRACT

A method for manufacturing aggregated resin particles, includes: preparing a microreactor that includes a first flow channel, a second flow channel, and a confluent flow channel, to which the first flow channel and the second flow channel merge; introducing a first fluid that contains resin particles dispersed therein into the first flow channel; introducing a second fluid that contains an aggregating agent into the second flow channel; feeding the first and second fluids so that a feed amount per unit time of the second fluid is greater than a feed amount per unit time of the first fluid, so as to form a laminar flow, in which the first fluid and the second fluid are merged, in the confluent flow channel; and forming aggregated resin particles by aggregating the resin particles.

6 Claims, 7 Drawing Sheets

METHOD FOR MANUFACTURING AGGREGATED RESIN PARTICLES

CROSS-REFERENCE TO RELATED APPLICATION

This application is based on and claims priority under 35 USC 119 from Japanese Patent Applications No. 2008-052481 filed Mar. 3, 2008.

BACKGROUND

1. Technical Field

The present invention relates to a method for manufacturing resin particles.

2. Related Art

Minute elements and apparatuses, represented by a microreactor and generally defined as "an apparatus, made by employment of microfabrication and in which a reaction is carried out in a microscopic flow channel having an equivalent diameter of no more than 500 μm," are recently being anticipated for application in various fields due to providing several merits such as high variety and low volume, high efficiency, low environmental load, etc., when applied, for example, to arts for performing analysis, synthesis, extraction, and separation of substances.

SUMMARY

According to an aspect of the invention, there is provided a method for manufacturing aggregated resin particles, including:

preparing a microreactor that includes: a first flow channel; a second flow channel; and a confluent flow channel, to which the first flow channel and the second flow channel merge;

introducing a first fluid that contains resin particles dispersed therein into the first flow channel;

introducing a second fluid that contains at least one of an aggregating agent and an aggregation promoter into the second flow channel;

feeding the first and second fluids so that a feed amount per unit time of the second fluid is greater than a feed amount per unit time of the first fluid, so as to form a laminar flow, in which the first fluid and the second fluid are merged, in the confluent flow channel; and forming aggregated resin particles by aggregating the resin particles.

BRIEF DESCRIPTION OF THE DRAWINGS

Exemplary embodiments of the present invention will be described in detail based on the following figures, wherein.

DETAILED DESCRIPTION

Figure 1:
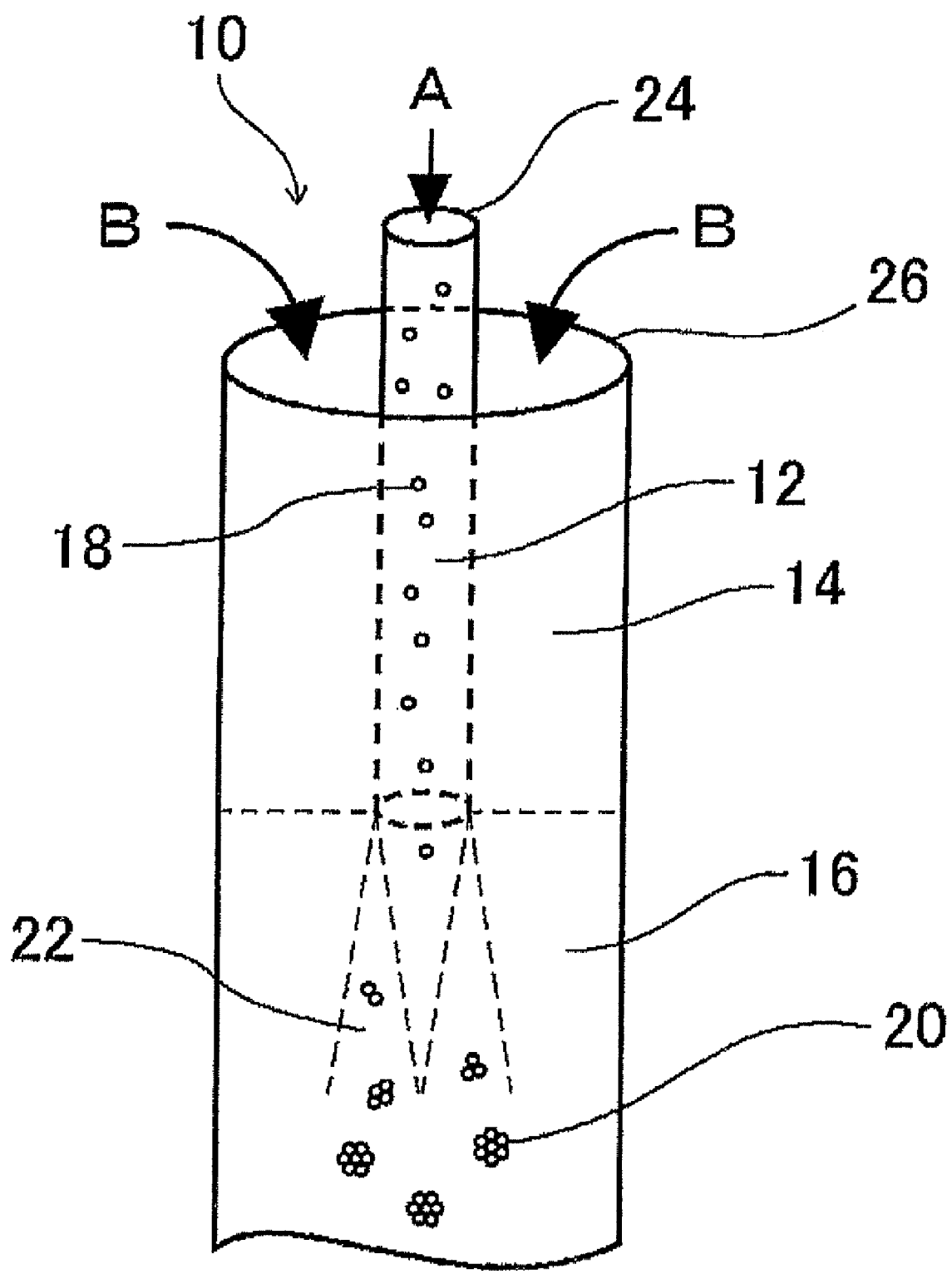
FIG. 1 is a schematic sectional view of an exemplary example of a microreactor used in a method for manufacturing aggregated resin particles according to an aspect of the present invention.

A method for manufacturing aggregated resin particles according to the present invention includes the steps of: preparing a microreactor, including at least a first flow channel, a second flow channel, and a confluent flow channel, to which the first flow channel and the second flow channel merge (hereinafter also referred to as the "preparation step"); and introducing a first fluid, having at least resin particles dispersed therein, into the first flow channel, introducing a second fluid, containing at least one of an aggregating agent and an aggregation promoter, into the second flow channel, feeding the first and second fluids so that a feed amount per unit time of the second fluid is greater than a feed amount per unit time of the first fluid, forming a laminar flow, in which the first fluid and the second fluid are merged, in the confluent flow channel, and aggregating the resin particles (hereinafter also referred to as the "aggregation step").

The method for manufacturing aggregated resin particles according to the present invention can be applied favorably to manufacture of an electrostatically charged image developing toner.

In the present invention, "aggregated resin particles" shall refer not only to particles that are simply aggregated but shall also include particles subject to any process after aggregation. For example, "aggregated resin particles" in the present invention includes particles that have been fused together after being aggregated.

The present invention shall now be described in detail with reference to the drawings.

(Microreactor (Preparation Step))

The method for manufacturing aggregated resin particles according to the present invention includes the step of: preparing a microreactor, including at least a first flow channel, a second flow channel, and a confluent flow channel, to which the first flow channel and the second flow channel merge.

The microreactor that can be used in the method for manufacturing aggregated resin particles according to the present invention includes at least the first flow channel, the second flow channel, and the confluent flow channel, to which the first flow channel and the second flow channel merge.

The microreactor that can be used in the present invention is a reactor having a plurality of flow channels (channels) of a microscale, that is for example, flow channels having a width of no less than several μm and no more than several thousand μm.

Due to being of a microscale, a flow channel in a microreactor is small in both dimension and flow velocity and has a Reynolds number of no more than 2,300. A reactor having a microscale flow channel is thus not a turbulent flow dominant apparatus as is the case with a normal reactor but is a laminar flow dominant apparatus.

Here, the Reynolds number (Re) is defined by the following formula:

$$Re = uL/v$$

(u: flow velocity, L: characteristic length, v: kinematic viscosity coefficient)

A laminar flow dominant state is achieved when the Reynolds number (Re) is approximately no more than 2,300.

Although a microchannel refers to a flow channel of microscale, it may also refer to an apparatus that includes such a flow channel. Such an apparatus may also be referred to comprehensively as a microreactor.

Unlike a conventional apparatus in which a reaction takes place in a turbulent flow, a microreactor enables a reaction to take place in a laminar flow.

When under a laminar flow dominant state, two or more different types of fluids are made to flow in laminar streams, diffusion due to concentration differences of substances in the fluids occurs at an interface region of laminar streams made up of the two or more different types of fluids, and consequently transfer of substances based on the concentration difference occurs. The larger the molecular weight of a molecule, the lower its diffusion rate.

When a reaction is made to occur in a laminar flow, for example, when two fluids are mixed, mixing can achieved by mutual diffusion at the interface region of the two fluids. Also in a microscale space, a specific interfacial area is large and this is an advantage in performing diffusion mixing at such an interface.

Although the first flow channel, the second channel, and the confluent flow channel in a microreactor that can be used in the present channel may merge in any configuration, preferably, the flow channels merge in a configuration in which the first fluid and the second fluid merge while forming a laminar flow in the confluent channel.

As preferable specific examples of the microreactor that can be used in the present invention, a microreactor in which the first flow channel is disposed concentrically in an interior of the second flow channel, a microreactor in which the flow channels are disposed in a Y-shaped configuration, etc., can be cited, and a microreactor, having a flow channel in which a fluid other than the first fluid and the second fluid is made to flow, for example, a microreactor, in which a flow channel is disposed so that a sheath flow that reduces a wall effect is formed by the other fluid, can also be cited as a preferable example.

In the microreactor that can be used in the present invention, preferably, the first fluid is fed without contacting an inner wall of the confluent flow channel, and furthermore, the microreactor preferably has a structure in which the first flow channel is disposed concentrically in an interior of the second flow channel as shown in FIG. 1. Even in this case, the first fluid may diffuse into another fluid including the second fluid and may finally contact the inner wall of the confluent flow channel at a downstream portion.

By the first fluid being fed without contacting the inner wall of the confluent flow channel, deposition of aggregated resin particles, etc., on the inner wall of the confluent flow channel can be prevented and formation of coarse particles can be suppressed.

In the present invention, a "coarse particle" refers to a component having a large particle diameter among particles having a particle diameter distribution and especially to a particle having a particle diameter of no less than 2.5 times a volume average particle diameter of the particles.

Preferably with the microreactor that can be used in the present invention, the inner wall of the first flow channel and the inner wall of the confluent flow channel are not formed in a continuous manner.

The microreactor that can be used in the present invention may have another flow channel besides the first flow channel, the second flow channel, and the confluent flow channel.

The other flow channel may merge at any position with the first flow channel, the second flow channel, or the confluent flow channel or may be formed independently without merging with the first flow channel, the second flow channel, and the confluent flow channel.

Also with the microreactor that can be used in the present invention, an outer circumferential flow channel diameter of the confluent flow channel is greater than a flow channel diameter of the first flow channel. With this mode, aggregation can be carried out with stability.

Furthermore, a function for controlling an amount of the fluid to be fed in these flow channels can be added. As these functions, a shutter function which can control an amount of the fluid due to its opening and closing and degree thereof and a function for applying a pulsation or a vibration to the fluid and the microreactor are exemplified. For example, by adding a function of applying a pulsation to the fluid, it is possible to discharge the fluid to be fed into the flow channel in droplet form.

A heating device, a cooling device, or other temperature controller may be installed in the microreactor that can be used in the present invention. In this case, temperature management is preferably performed using the temperature controller. The temperature controller may be built in the microreactor. Also with the present invention, an entirety of a device for temperature control may be disposed inside a temperature controlled container, or an analyzer, etc., for observation and control of a mixing state of a dispersion may be installed in the microreactor or may be built in the microreactor.

The microreactor that can be used in the present invention preferably includes a temperature controller capable of controlling a temperature inside the confluent flow channel, and more preferably includes a heater or a microwave irradiating device at a confluent flow channel portion. By heating the fluid in the confluent flow channel to an appropriate temperature, aggregation of resin particles, etc., can be carried out efficiently. As a heater, a metal resistor or a polysilicon, etc., can be used favorably.

In a case where a microwave irradiating device is used to perform heating, a fluid can be heated in an extremely short time and an irradiated portion can be heated uniformly.

A diameter or a long side (flow channel diameter) of the micro flow channel at a portion of the confluent flow channel is no more than 5,000 μm, preferably in a range of no less than 10 μm and no more than 1,000 μm, and more preferably in a range of no less than 30 μm and no more than 500 μm. The flow channel diameter in a case where a cross section of the flow channel is not circular, square, or rectangular shall be a circle equivalent diameter (diameter) determined from a cross-sectional area of the flow channel as cut by a plane perpendicular to a flow direction.

A depth of the flow channel is preferably in a range of no less than 10 μm and no more than 500 μm.

Furthermore, although depending on a concentration of the aggregating agent, an aggregation rate, a temperature during aggregation, etc., a length of the confluent flow channel is preferably in a range of no less than 5 mm and no more than 1,000 mm and more preferably in a range of no less than 10 mm and no more than 400 mm. In the above range, a reaction is completed adequately, aggregated particles can be made low in opportunity of contact with the inner wall of the flow channel, and flow channel contamination due to deposition of aggregated particles can be suppressed.

A shape of the flow channel is not restricted in particular, and a cross-sectional shape in a direction perpendicular to the flow direction may be circular, elliptical, polygonal (including rectangular), donut-shaped, potbelly-shaped, or other desired shape.

A material of the microreactor may be any material that does not give rise to any problems in particular during feeding of the first fluid and the second fluid and during the aggregation process, and such materials as metals, ceramics, glass, fused silica, silicone, synthetic resins, etc., can be cited as examples, and due to being excellent in heat resistance and resistance against chemicals, glass or fused silica is preferable.

As synthetic resins to be used as the material of the microreactor, polyester resins, styrene resins, acrylic resins, styrene-acrylic resins, silicone resins, epoxy resins, diene-based resins, phenol resins, terpene resins, coumarin resins, amide resins, amide-imide resins, butyral resins, urethane resins, ethylene-vinyl acetate resins, etc., can be cited as specific preferable examples from the standpoint of impact resistance, heat resistance, resistance against chemicals, transparency, etc., and acrylic resins and epoxy resins are more preferable.

Also, thermosetting resins, photosetting resins, and thermoplastic resins described in the "Concise Encyclopedia of Polymer Science and Engineering" (published by Maruzen Co., Ltd., 1994) can be used favorably as desired.

A size of the microreactor can be set as appropriate according to a purpose of use.

The microreactor may have portions having functions of separation, purification, analysis, washing, etc., according to application.

Preferably, the microreactor is also provided as necessary with feed ports for feeding fluids into the first flow channel and the second flow channel, a recovery port for recovering fluids from the microreactor, etc.

In regard to the microreactor, a plurality of microreactors may be combined or the microreactor may be combined with devices with functions of separation, purification, analysis, washing, etc., feeding devices, recovery devices, and other micro flow channel devices, etc., to favorably construct a microchemical system according to the application.

Specifically as the microreactor that can be used in the method for manufacturing aggregated resin particles according to the present invention, a microreactor described below can be cited as a favorable example.

FIG. 1 is a schematic sectional view of an example of a microreactor used in the method for manufacturing aggregated resin particles according to the present invention.

The microreactor 10 shown in FIG. 1 has a structure where a member 24 forming a first flow channel (first flow channel forming member) and a member 26 forming a second flow channel (second flow channel forming member) are disposed concentrically. The first flow channel forming member 24 forms a first flow channel 12, and at an outer periphery thereof, the second flow channel forming member 26 forms a second flow channel 14 with a donut-like cross sectional shape. The first flow channel forming member 24 has a length extending to an intermediate portion of the second flow channel forming member 26, and a confluent flow channel 16 is formed at a downstream side of a tip of the first flow channel forming member 24.

A first fluid A, containing resin particles 19, is fed into the first flow channel 12, and a second fluid B, containing an aggregating agent and/or an aggregation promoter, is fed into the second flow channel 14.

The first fluid A and the second fluid B merge in the confluent flow channel 16 and while forming a laminar flow, gradually diffuse into each other at a boundary region of the fluids (diffusion portion 22). In the diffusion portion 22, components including the resin particles 18 undergo aggregation due to the aggregating agent and/or the aggregation promoter and aggregated resin particles 20 are formed.

Figure 2:
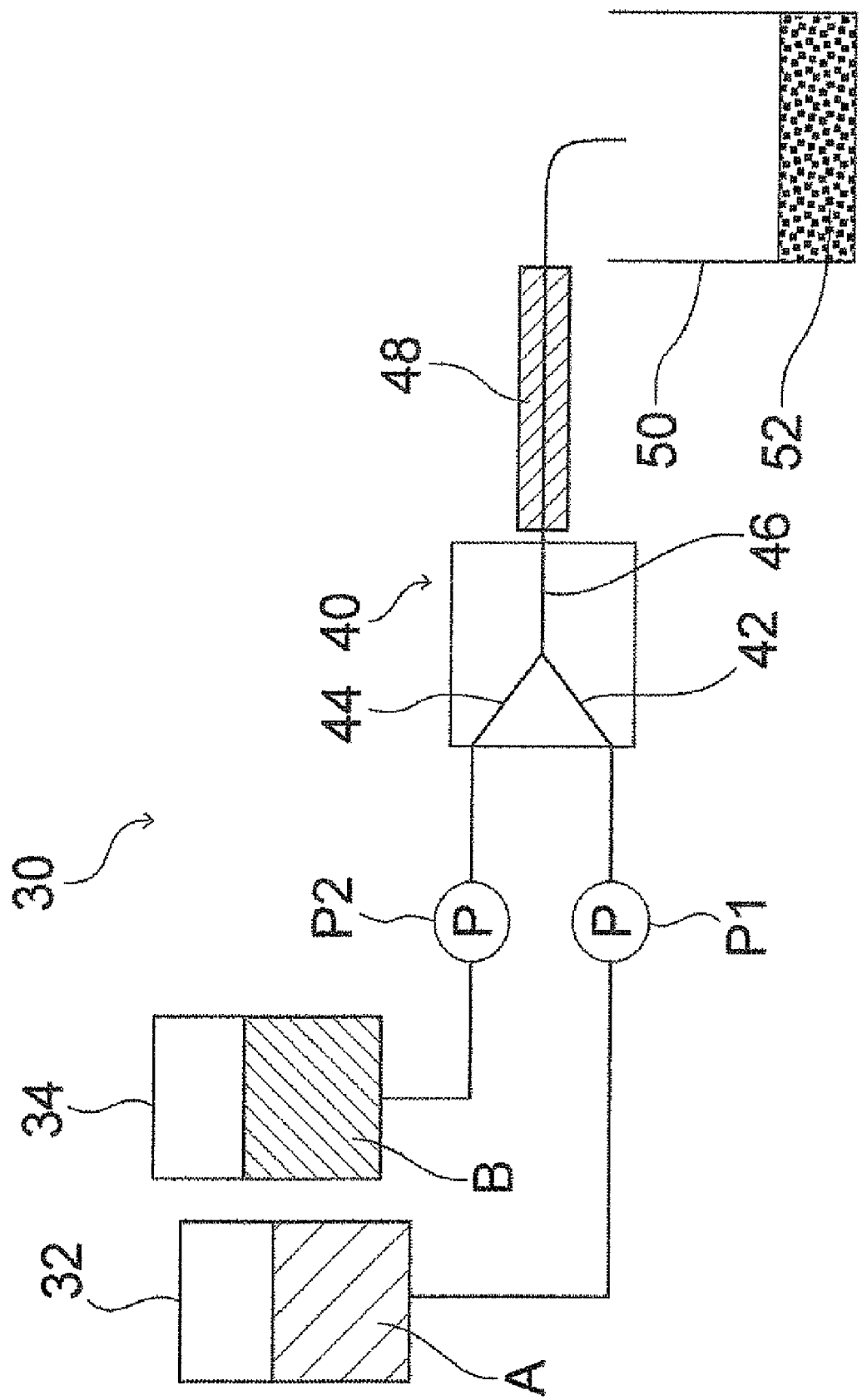
FIG. 2 is a schematic sectional view of another exemplary example of a microreactor used in the method for manufacturing aggregated resin particles according to an aspect of the present invention.

FIG. 2 is a schematic sectional view of another example of a microreactor used in a method for manufacturing aggregated resin particles according to the present invention.

Figure 3:
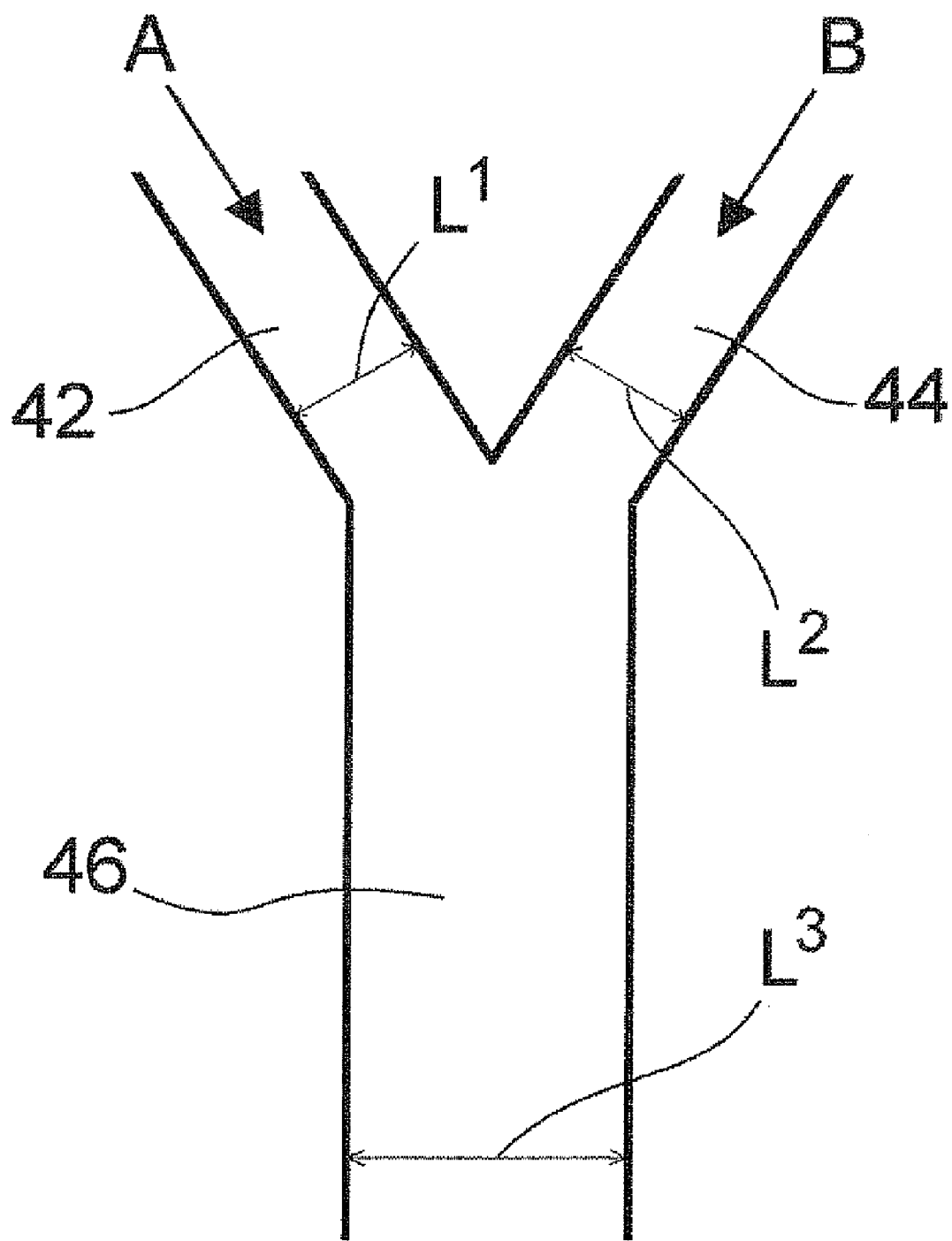
FIG. 3 is an enlarged schematic sectional view of a vicinity of a flow channel merging portion in the exemplary example of the microreactor shown in FIG. 2.

FIG. 3 is an enlarged schematic sectional view of a vicinity of a flow channel merging portion in the other example of the microreactor shown in FIG. 2.

An apparatus 30 shown in FIG. 3 includes two tanks 32 and 34, the microreactor 40, feed pumps P1 and P2, a heater 48, a container 50, and flow channels.

The first fluid A, containing the resin particles, are placed in the tank 32, and the second fluid B, containing the aggregating agent and/or the aggregation promoter, is placed in the tank 34.

The first fluid A in the tank 32 and the second fluid B in the tank 34 are fed into a first flow channel 42 and a second flow channel 44 by the feed pumps P1 and P2, respectively, and merge at a confluent flow channel 46. Inside the confluent flow channel 46, aggregation of the components including the resin particles occurs, the aggregated resin particles are thereby formed, and an aggregated-resin-particle-containing fluid 52 is obtained. The aggregated-resin-particle-containing fluid 52 is recovered in the container 50.

The heater 48 is installed at the confluent flow channel 46.

A temperature of the heater 48 may be controlled by a temperature controller as necessary, or another heating device or cooling device may be provided.

The device for controlling the temperature of the heater 48, etc., is not restricted in particular in installation position and may be disposed at any position, for example, inside the microreactor 40, or an entirety of the apparatus 30 or an entirety of the microreactor 40 may be placed in a temperature controlled container.

The respective flow channels (channels) 42, 44, and 46 of the microreactor 40 are micro scale flow channels.

The microreactor 40 shown in FIG. 2 can be prepared favorably on a solid substrate by a microfabrication art.

The microfabrication art is not restricted in particular, and an LIGA art using X-rays, a method of using a resist according to a photolithography method, a method of etching resist opening portions, a microdischarge processing method, a laser processing method, a mechanical micro cutting method using micro tools made of a hard material, such as diamond, etc., can be cited as examples. These arts may be employed singly or may be employed in combination.

Figure 4:
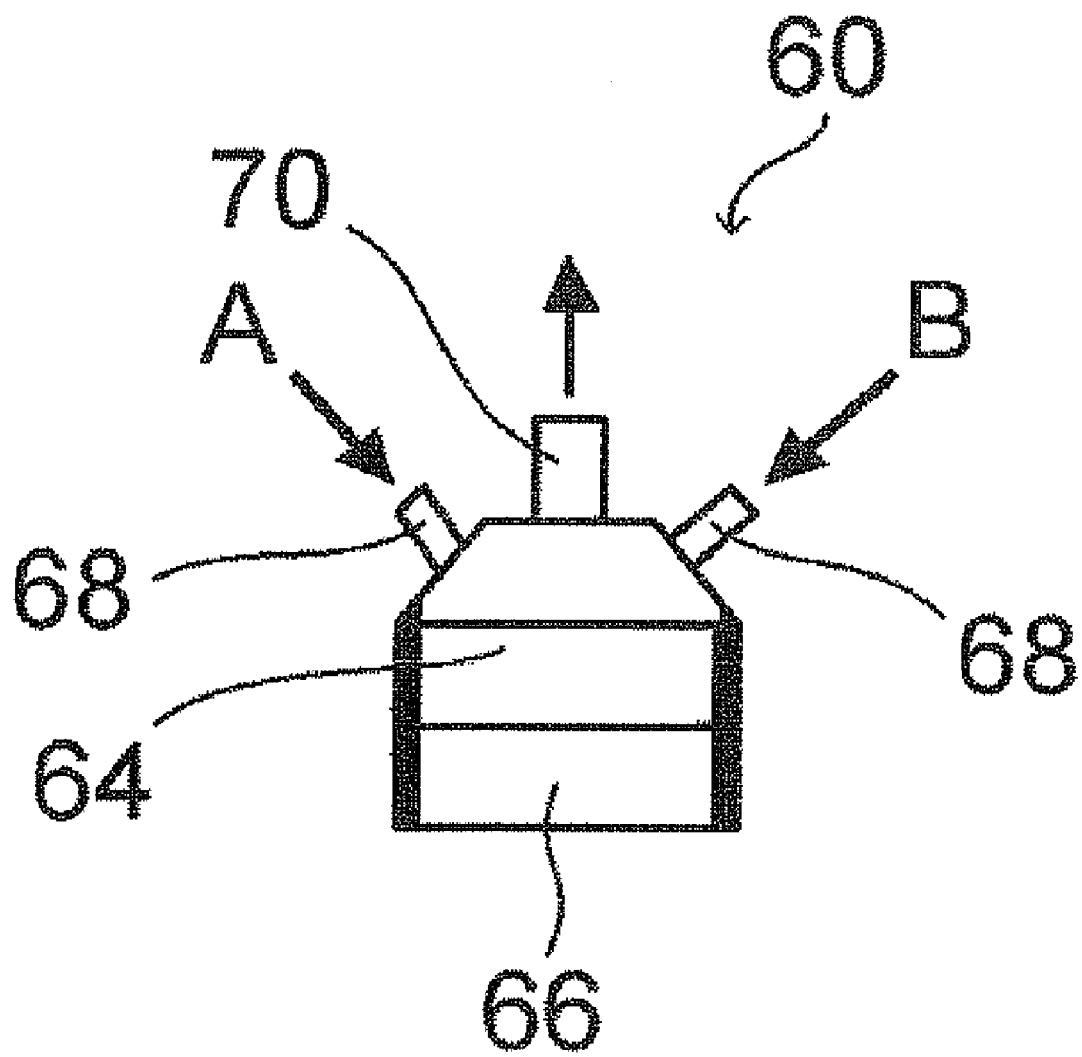
FIG. 4 is a schematic view of yet another exemplary example of a microreactor used in the method for manufacturing aggregated resin particles according to an aspect of the present invention.

FIG. 4 shows a microreactor made by Institut fur Mikrotechnik Mainz GmbH, Germany (IMM) that can be used favorably in the present invention.

Figure 5:
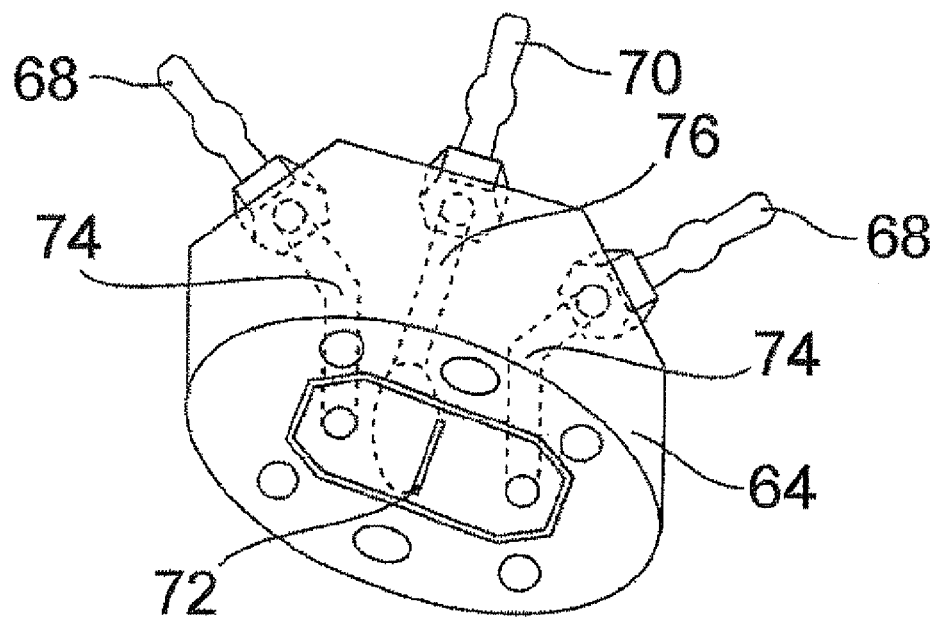
FIG. 5 is a diagram of a state of disassembling the exemplary example of the microreactor shown in FIG. 4, and in FIG. 5, a microreactor upper portion 64 is shown in a state of being viewed from a bottom, and a mixing element 62 and a microreactor lower portion 66 are shown in a state of being viewed from a top.
Figure 5:
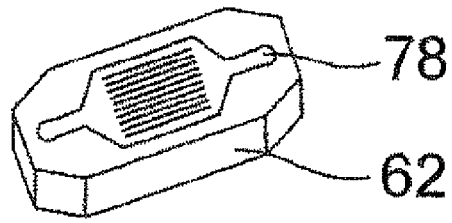
Figure 5:
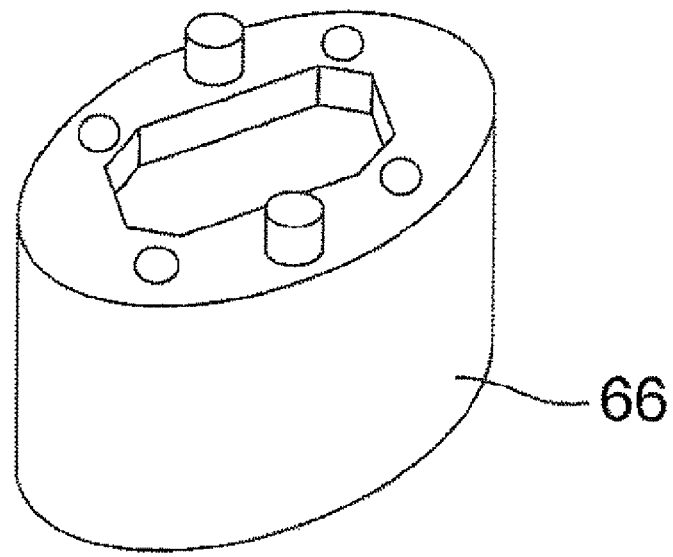

FIG. 5 is a diagram of a state of disassembling the yet another microreactor example shown in FIG. 4, and in FIG. 5, a microreactor upper portion 64 is shown in a state of being viewed from a bottom, and a mixing element 62 and a microreactor lower portion 66 are shown in a state of being viewed from a top.

Figure 6:
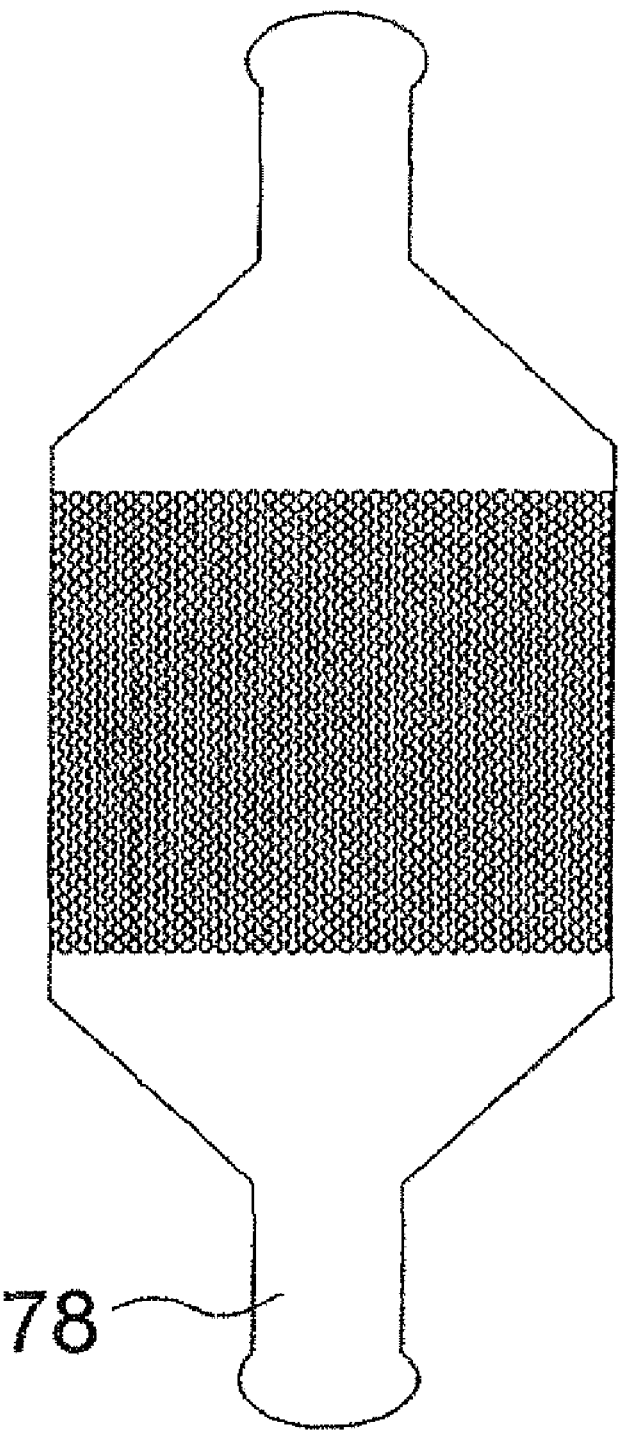
FIG. 6 is a diagram of an exemplary example of the mixing element 62 shown in FIG. 5.

FIG. 6 is a diagram of an example of the mixing element 62 shown in FIG. 5.

The microreactor shown in FIG. 4 includes the mixing element 62, the microreactor upper portion 64, and the microreactor lower portion 66 as shown in FIG. 5. Although these parts are illustrated in a disassembled state in FIG. 5, in actual use, these are assembled integrally and used as shown in FIG. 4.

The mixing element 62 shown in FIG. 6 has flow channels divided by microfabrication on a top surface, that is, flow channels, divided from both sides of the mixing element by grooves of shapes such as shown in FIG. 6. By introduction of the first fluid and the second fluid used for reaction into this portion, a plurality of side streams are formed.

A width per single divided flow channel is preferably no more than 100 μm and more preferably no more than 50 μm from the standpoint of mixing. Although a lower limit is not defined in particular, it is of the order of several μm in terms of manufacture. Although a depth of the flow channel is also not restricted in particular, it can be set, for example, in a range of 10 to 500 μm.

The divided flow channels of the mixing element 62 can be formed by application of a microfabrication art employed in electronic arts.

The microreactor upper portion 64 in FIG. 5 has two inlets 68 and a single outlet 70. The inlets 68 continue to injection flow channels 74 and terminal ends of the injection flow channels 74 are connected to mixing element flow channel ends 78. The outlet 70 continues to a discharge flow channel 76, and a terminal end of the discharge flow channel 76 forms a slit 72 disposed at a substantially central portion of a bottom surface of the microreactor upper portion 64. When the microreactor is assembled, the slit 72 contacts substantially a center of the mixing element 62. A flow channel putting the flow channels on the mixing element 62 in communication with the slit 72 is thereby formed.

The microreactor lower portion 66 has a recess for fixing the mixing element 62. By the mixing element 62 being fixed in the recess, seamlessly divided flow channels are formed to enable a reaction to be carried out satisfactorily.

When the mixing element 62, the microreactor upper portion 64, and the microreactor lower portion 66 are assembled together, flow channels that are put in communication along a pathway of the sequence: inlets 68, injection flow channels 74, mixing element flow channel ends 78, divided flow channels on the mixing element 62, slit 72, discharge flow channel 76, and outlet 70; are formed.

A microspace that serves as a mixing location is present between the mixing element 62 and the slit 72.

Fluids fed in from the inlets 68 are fed into the mixing element flow channel ends 78 via the injection flow channels 74. The fluids fed into the mixing element flow channel ends 78 are respectively made to flow by injection pressures toward a center from the respective ends of the mixing element 62 through the divided flow channels on the mixing element 62, and the plurality of side streams are formed as a result. A reaction proceeds by the side streams coming into contact in the microspace present between the mixing element 62 and the slit 72. Because the reaction occurs in the microspace, conditions, such as a reaction temperature, etc., can be controlled readily, and because several side streams come into contact substantially simultaneously, raw materials become mixed adequately even if stirring is not performed, and energy efficiency is thus high. Also because the reaction is carried out by continuously injecting raw material solutions at fixed rates, the reaction is carried out by continuous operation and the reaction conditions can be kept fixed readily.

A volume of the microspace in which the reaction occurs may be of a microliter order, that is for example, 10 μL and is not restricted particular.

The two fluids coming into contact at the microspace flow into the slit 72. Further mixing occurs during the flow into the slit 72. In consideration of mixing efficiency, the slit 72 preferably has a width of no more than 500 μm.

The rates of injection of the fluids, though depending on an internal volume of the slit, are preferably set to flow rates of no less than 10 mL/hour and preferably no more than 1.5 L/hour. When the flow rates are no less than 10 mL/hour, flow velocities become high and aggregation can be carried out efficiently. When the flow rates are no more than 1.5 L/hour, the flow rates can be controlled to be fixed readily and a high pressure is not applied to the microreactor.

A reaction solution that has passed through the slit 72 is discharged via the discharge flow channel 76 to an exterior of the microreactor 60 and collected in an appropriate container.

As specific examples of microreactors that can be used by the present invention besides those described above, microreactors described in publications of Institut fur Mikrotechnik Mainz GmbH, Germany, a collision microreactor described in Japanese Published Unexamined Patent Application No. 2005-288254, a microreactor described in Japanese Published Unexamined Patent Application No. 2005-37780, etc., can be cited.

(Aggregation Step)

The method for manufacturing aggregated resin particles according to the present invention includes the step of introducing the first fluid, having at least resin particles dispersed therein, into the first flow channel, introducing the second fluid, containing the aggregating agent and/or the aggregation promoter, into the second flow channel, feeding the first and second fluids so that a feed amount per unit time of the second fluid is greater than a feed amount per unit time of the first fluid, forming a laminar flow, in which the first fluid and the second fluid are merged, in the confluent flow channel, and aggregating the resin particles.

The aggregated resin particles obtained in the aggregation step in the present invention are at least aggregates of resin particles.

With the method for manufacturing aggregated resin particles according to the present invention, inside the confluent flow path, the first fluid, having at least the resin particles dispersed therein, and the second fluid, containing the aggregating agent and/or the aggregation promoter, are fed so that a feed amount per unit time of the second fluid is greater than a feed amount per unit time of the first fluid, a laminar flow, into which the fluids merge, is formed, and the aggregated resin particles are formed by mutual diffusion occurring at a boundary region of the fluids thereby initiating and/or promoting the aggregation of the resin particles etc. In the aggregation step, the interior of the confluent flow channel is preferably maintained in a laminar flow state so that diffusion based on concentration differences is maintained between laminar streams.

In the aggregation step, the feed amount per unit time of the second fluid is greater than the feed amount per unit time of the first fluid. Furthermore, it is preferred that the feed amount per unit time of the second fluid is no less than 5 times and no more than 30 times the feed amount per unit time of the first fluid.

The volume average particle diameter of the aggregated resin particles is preferably no less than 1 μm and no more than 15 μm, and more preferably no less than 1 μm and no more than 10 μm.

A volume average particle size distribution index GSDv of the aggregated resin particles is preferably no less than 1.0 and no more than 1.5 and more preferably no less than 1.0 and no more than 1.47.

Coulter Counter TA-II (made by Beckman Coulter, Inc.) can be used for average particle diameter measurement of the resin particles, aggregated resin particles, and other particles. In this case, measurements are made using an optimal aperture according to a particle diameter level of the particles. The measured particle diameter is expressed as a volume average particle diameter.

In a case where the particle diameter of the particles is no more than approximately 5 μm, measurements can be made with a laser diffraction scattering particle size distribution measuring device (LA-700, made by Horiba, Ltd.).

In a case where the particle diameter is of the nanometer order, measurements are made with a BET type specific surface area measuring device (Flow Sorb II 2300, made by Shimadzu Corp.).

A volume average primary particle diameter, a number average particle size distribution index, the volume average particle size distribution index, etc., of the prepared aggregated particles can be measured using a measuring device such as Coulter Counter TA-II (made by Beckman Coulter, Inc.), Multisizer II (made by Nikkaki Co., Ltd.), etc. Cumulative distributions are determined for volume and number from a small diameter side according to particle size ranges (channels) partitioned based on particle size distributions, and the particle sizes at a cumulative percentage of 16% are defined as the volume $D_{16v}$ and the number $D_{16P}$, the particle sizes at a cumulative percentage of 50% are defined as the volume $D_{50v}$ and the number $D_{50P}$, and the particle sizes at a cumulative percentage of 84% are defined as the volume $D_{84v}$ and the number $D_{84P}$. Using these values, the volume average particle size distribution index (GSDv) can be computed as $(D_{84v}/D_{16v})^{1/2}$, and the number average particle size distribution index (GSDp) can be computed as $(D_{84P}/D_{16P})^{1/2}$.

In a case where the aggregated resin particles obtained by the method for manufacturing aggregated resin particles according to the present invention are to be used to prepare an electrostatically charged image developing toner, the aggregated resin particles preferably contain the resin particles, a colorant, and a release agent.

Preferably in the aggregation step, the confluent flow channel is heated. As mentioned above, by using a micro flow channel including a heater, a microwave irradiating device, or other temperature controller to heat the interior of the confluent flow channel, the aggregation can be made to proceed efficiently.

A temperature inside the confluent flow channel in the aggregation step, although dependent on the resin particles, the aggregating agent, etc., used, is preferably no less than 15° C. and no more than 100° C. and more preferably no less than 20° C. and no more than 80° C.

<First Fluid>

The first fluid in the method for manufacturing aggregated resin particles according to the present invention is a dispersion containing at least the resin particles. The first fluid may further contain a dispersion medium or compounds and resins etc. other than the resin particles. The dispersion medium may be a liquid, a gas or a mixture thereof, but a dispersion liquid containing at least resin particles, namely containing a fluid component as a dispersion medium is preferred.

Although the fluid component in the first fluid is not restricted in particular as long as it is a fluid that does not dissolve the resin particles and does not inhibit aggregation, the fluid component preferably has a water based medium as a main component and more preferably has water as the main component.

As examples of a water based medium that can be used in the present invention, water, such as distilled water, ion exchange water, etc., and alcohols, such as ethanol, methanol, etc., can be cited. Among these, water, such as distilled water, ion exchange water, etc., is especially preferable. One type of such a medium may be used singly or two or more types may be used in combination.

The water based medium may contain a water-miscible organic solvent. Acetone, acetic acid, etc., can be cited as examples of a water-miscible organic solvent.

Furthermore, the first fluid may contain a surfactant and an aggregating agent as necessary.

Preferably the main component of the fluid component in the first fluid and the main component of the fluid component in the second fluid are the same fluid.

The first fluid in the method for manufacturing aggregated resin particles according to the present invention may contain just one type of resin particles or may contain two or more types of resin particles.

An amount of solids, including the resin particles, in the first fluid is preferably no less than 1% by weight and no more than 50% by weight and more preferably no less than 3% by weight and no more than 40% by weight. In this range, the first fluid has an appropriate fluidity.

[Resin Particles]

The volume average particle diameter of the resin particles that can be used in the present invention is preferably no less than 0.01 μm and no more than 2.0 μm and more preferably no less than 0.01 μm and no more than 1.0 μm. When the volume average particle diameter is within this range, a dispersion state of the resin particles in a water-based medium is stabilized.

A resin making up the resin particles is not restricted in particular, and the following thermoplastic resins can be cited as preferable examples.

That is, specific examples of a thermoplastic resin include homopolymers and copolymers of styrenes, such as styrene, para-chlorostyrene, α-methylstyrene, etc., (styrene based resins); homopolymers and copolymers of esters with vinyl groups, such as methyl acrylate, ethyl acrylate, n-propyl acrylate, n-butyl acrylate, lauryl acrylate, 2-ethylhexyl acrylate, methylmethacrylate, ethylmethacrylate, n-propyl methacrylate, lauryl methacrylate, 2-ethylhexyl methacrylate, etc., (acrylate based resins); homopolymers and copolymers of vinyl nitriles, such as acrylonitrile, methacrylonitrile, etc., (vinyl nitrile based resins); homopolymers and copolymers of vinyl ethers, such as vinyl ethyl ether, vinyl isobutyl ether, etc., (vinyl ether based resins); homopolymers and copolymers of vinyl methyl ketone, vinyl ethyl ketone, and vinyl isopropenyl ketones (vinyl ketone based resins); homopolymers and copolymers of olefins, such as ethylene, propylene, butadiene, isoprene, etc., (olefin based resins); non-vinyl condensation resins, such as epoxy resins, polyester resins, polyurethane resins, polyamide resins, cellulose resins, polyether resins, etc., and graft polymers of such non-vinyl condensation resins and vinyl based monomers, etc. One type of such a resin may be used singly or two or more types may be used in combination.

Among these resins, polyester resins and/or any of various vinyl based resins is preferably contained in the form of the resin particles, and more preferably, an acrylate based resin is contained, and even more preferably, a styrene-butyl acrylate copolymer is contained. These vinyl based resins are advantageous in that a resin particle dispersion can be prepared readily by emulsion polymerization or seed polymerization, etc., using a surfactant, etc.

In the present invention, a cross-linking agent may be added as necessary to a binder resin.

Specific examples of such a cross-linking agent include aromatic multivinyl compounds, such as divinylbenzene, divinylnaphthalene, etc.; multivinyl esters of aromatic polycarboxylic acids, such as divinyl phthalate, divinyl isophthalate, divinyl terephthalate, divinyl homophthalate, divinyl/trivinyl trimesate, divinyl naphthalenedicarboxylate, divinyl biphenylcarboxylate; divinyl esters of nitrogen-containing aromatic compounds, such as divinyl pyridinedicarboxylate; vinyl esters of unsaturated heterocyclic compound carboxylic acids, such as vinyl pyromucate, vinyl furancarboxylate, vinyl pyrrole-2-carboxylate, vinyl thiophenecarboxylate, etc.; (meth) acrylic acid esters of linear polyhydric alcohols, such as butanediol methacrylate, hexanediol acrylate, octanediol methacrylate, decanediol acrylate, dodecanediol acrylate, etc.; (meth)acrylic acid esters of branched and substituted polyhydric alcohols, such as neopentyl glycol dimethacrylate, 2-hydroxy-1,3-diacryloxypropane, etc.; polyethylene glycol di(meth)acrylate, polypropylene-polyethylene glycol di(meth)acrylates; multivinyl esters of polycarboxylic acids such as divinyl succinate, divinyl fumarate, vinyl/divinyl maleate, divinyl diglycolate, vinyl/divinyl itaconate, divinyl acetonedicarboxylate, divinyl glutarate, divinyl 3,3'-thiodipropionate, divinyl/trivinyl trans-aconitate, divinyl adipate, divinyl pimelate, divinyl suberate, divinyl azelate, divinyl sebacate, divinyl dodecanedioate, divinyl brassylate, etc.

In the present invention, one type of such a cross-linking agent may be used singly or two or more types may be used in combination.

Of the abovementioned cross-linking agents, (meth) acrylic acid esters of linear polyhydric alcohols, such as butanediol methacrylate, hexanediol acrylate, octanediol methacrylate, decanediol methacrylate, dodecanediol methacrylate, etc.; (meth)acrylic acid esters of branched and substituted polyhydric alcohols, such as neopentylglycol dimethacrylate, 2-hydroxy-1,3-diacryloxypropane, etc; polyethylene glycol dimeth)acrylate, and polypropylene-polyethylene glycol di(meth)acrylates, etc., which can suppress precipitation of a release agent on a toner surface during cooling so that a viscosity is not made higher than necessary in a coalesced state, are preferably used in the case of using the aggregated resin particles as a raw material of an electrostatically charged image developing toner.

A content of the cross linking agent in a total amount of polymerizable monomers used to form the resin is preferably in a range of no less than 0.05% by weight and no more than 5% by weight and more preferably in a range of no less than 0.1% by weight and no more than 1.0% by weight.

Of the above resins, the resins, such as the styrene based resins, vinyl based resins, olefin based resins, etc., can be manufactured by radical polymerization, etc., of the abovementioned polymerizable monomers.

A radical polymerization initiator used here is not restricted in particular, and a known initiator may be used.

A known chain transfer agent may used for molecular weight adjustment of the resin, and thiols and carbon tetrabromide, etc., can be cited as examples.

The chain transfer agent is not restricted in particular and a known chain transfer agent may be used.

The polyester resin is not restricted in particular and may be synthesized favorably from a known polycarboxylic acid, polyol, or a derivative of these compounds. Among these, a polyester resin using a known dicarboxylic acid and a known diol as main components is more preferable.

The polyester resin may be crystalline or amorphous. Furthermore, two or more types of polyester resin may be used in combination.

In synthesizing the polyester resin or other polycondensation resin, a polycondensation catalyst is preferably used. As the polycondensation catalyst, a known catalyst may be used.

In the case of using the aggregated resin particles as a raw material of an electrostatically charged image developing toner, the abovementioned resin preferably has a weight average molecular weight Mw in a range of no less than 6,000 and no more than 45,000, and in a case where the binder resin is a polyester resin, the weight average molecular weight Mw is preferably in a range of no less than 6,000 and no more than 30,000, and in a case where the binder resin is a vinyl based resin, the weight average molecular weight Mw is preferably in a range of no less than 24,000 and no more than 36,000.

When the weight average molecular weight Mw is no more than 45,000, solubility in a fixing process is good and an image of excellent transmittance can be obtained. When the weight average molecular weight is no less than 6,000, a melt viscosity of the toner in the fixing process is favorable and because an excellent cohesive force is provided, occurrence of hot offset can be suppressed.

In a case where the binder resin is a polyester resin, good dispersion in a water based medium is realized when the weight average molecular weight is no more than 30,000.

Also in the case of using the aggregated resin particles as a raw material of an electrostatically charged image developing toner, the resin has a weight average molecular weight Mw to number average molecular weight Mn ratio (Mw/Mn) of preferably no more than 3.3 and more preferably no more than 2.8.

To quicken transfer of a release agent onto a fixed image surface and to obtain a smooth fixed image surface, a suitably low viscosity is advantageous and it is preferable for the binder resin to have a narrow molecular weight distribution. Also, an Mw/Mn of no more than 3.3 is preferable because the transmittance of the resin is good in this case.

[Colorant]

Either or both of the first fluid and the second fluid in the present invention may contain a colorant. Especially in the case of using the aggregated resin particles to manufacture an electrostatically charged image developing toner, the first fluid preferably contains a colorant and more preferably contains colorant particles.

A colorant that can be used in the present invention may be a known colorant and is not restricted in particular. In the case of using the aggregated resin particles to manufacture an electrostatically charged image developing toner, a colorant that is known for toner applications can be used favorably.

Examples of a colorant include various pigments, such as chrome yellow, Hanza yellow, benzidine yellow, threne yellow, quinoline yellow, permanent orange GTR, pyrazolone orange, vulcan orange, watchang red, permanent red, brilliant carmine 3B, brilliant carmine 6B, Du Pont oil red, pyrazolone red, lithol red, rhodamine B lake, lake red C, rose Bengal, aniline blue, ultramarine blue, calco oil blue, methylene blue chloride, phthalocyanine blue, phthalocyanine green, malachite green oxalate, etc.; and various dyes such as acridine based dyes, xanthene based dyes, azo based dyes, benzoquinone based dyes, azine based dyes, anthraquinone based dyes, dioxazine based dyes, thiazine based dyes, azomethine based dyes, indigo based dyes, thioindigo based dyes, phthalocyanine based dyes, polymethine based dyes, triphenylmethane based dyes, diphenylmethane based dyes, thiazol based dyes, xanthene based dyes, etc. One type of such a colorant may be used singly or two or more types may be used in combination.

In the case of manufacturing an electrostatically charged image developing toner, a content of the colorant in the aggregated resin particles with respect to the total amount of the aggregated resin particles is preferably no more than 50% by weight and more preferably in a range of no less than 2% by weight and no more than 20% by weight.

A volume average particle diameter of colorant particles using the above-described colorant is preferably no more than 1 μm, more preferably no more than 0.5 μm, and even more preferably in a range of no less than 0.01 μm and no more than 0.5 μm. In the case of manufacturing an electrostatically charged image developing toner, it is preferable for the volume average particle diameter to be no more than 1 μm because the electrostatically charged image developing toner that is obtained finally is then narrow in particle distribution, formation of floating particles is low, and the toner is high in performance and reliability.

By adjusting the volume average particle diameter of the colorant to be in the abovementioned range, the colorant can be dispersed satisfactorily in the aggregated particles, and in the case of manufacturing an electrostatically charged image developing toner, biasing of composition among toner particles can be suppressed to provide a merit that variation of the toner performance and reliability can be held low. Also it is preferable to make the volume average particle diameter no more than 0.5 μm because, in the case of manufacturing an electrostatically charged image developing toner, a color developing property, color reproducibility, etc., of the toner can then be improved further.

[Release Agent]

In the case of manufacturing an electrostatically charged image developing toner using the aggregated resin particles, the first fluid preferably contains a release agent and more preferably contains release agent particles.

As a release agent that can be used in the present invention, a release agent that is poor in compatibility (incompatible) with the resin particles is preferable. When the release agent is poor in compatibility with the resin particles, it does not become blended with the resin particles and therefore does not promote plasticization of the resin particles, and in the case of use in an electrostatically charged image developing toner, the release agent does not lower the viscosity of the toner at the time of fixation at high temperatures and become a cause of occurrence of offset.

Specific examples of a release agent include low molecular weight polyolefins, such as polyethylene, polypropylene, polybutene, etc.; silicones exhibiting a softening temperature upon heating; aliphatic acid amides, such as oleamide, erucamide, ricinoleamide, stearamide, etc.; vegetable waxes, such as carnauba wax, rice wax, candelilla wax, haze wax, jojoba oil, etc.; animal waxes, such as bees wax, etc.; mineral petroleum waxes, such as montan wax, ozokerite wax, ceresine, paraffin wax, microcrystalline wax, Fisher-Tropsch wax, etc.; ester waxes of a higher aliphatic acid and a higher alcohol, such as stearyl stearate, behenyl behenate, etc.; ester waxes of a higher aliphatic acid and a monohydric or polyhydric lower alcohol, such as butyl stearate, propyl oleate, glyceride monostearate, glyceride distearate, pentaerythritol tetrabehenate, etc.; ester waxes of a higher aliphatic acid and a polyhydric alcohol multimer, such as diethylene glycol monostearate, dipropyleneglycol distearate, diglyceride distearate, triglyceride tetrastearate, etc.; higher aliphatic acid sorbitan ester waxes, such as sorbitan monostearate, etc.; and higher aliphatic acid cholesterol ester waxes, such as cholesteryl stearate etc.

In the case of manufacturing an electrostatically charged image developing toner, an amount of the release agent in the aggregated resin particles with respect to the total amount of the aggregated resin particles is preferably in a range of no less than 6% by weight and no more than 25% by weight and more preferably in a range of no less than 9% by weight and no more than 20% by weight. When the release agent amount is no less than 6% by weight, the amount is adequate as an absolute amount of the release agent and in the case of use in an electrostatically charged image developing toner, occurrence of so-called document offset, with which a fixed image becomes transferred onto an opposing sheet or image due to heat or pressure, can be suppressed. Also when the release agent amount is no more than 25% by weight, in the case of use in an electrostatically charged image developing toner, the toner is provided with a satisfactory viscoelasticity that is required during fixing, and occurrence of hot offset can be suppressed. Also, even when an image is formed on a non-absorbing substrate, deposition of the release agent on a fixing roll can be suppressed, an occurrence of a phenomenon called wax offset, in which release agent marks become left on a surface of a non-absorbing substrate in a second rotation onwards, can be suppressed.

A volume average particle diameter of the release agent particles is preferably no more than 1.5 μm and more preferably in a range of no less than 0.1 μm and no more than 1.0 μm. When the volume average particle diameter is no more than 1.5 μm, free particles are unlikely to be formed and, in the case of use in an electrostatically charged image developing toner, a release agent domain diameter in the electrostatically charged image developing toner that is obtained finally is favorable and the toner is improved in performance and reliability.

A method for preparing the resin particles is not restricted in particular and a known method may be used.

Specifically, resin particles prepared by an emulsion polymerization method, suspension polymerization, phase inversion emulsification, etc., may be used, a resin obtained by a bulk polymerization method may be broken apart mechanically to form the resin particles, or resin particles obtained by emulsion dispersion by mechanical shearing, etc., of a resin obtained by any polymerization method may be used. A resin particle dispersion prepared by any of such methods may be used as the first fluid or a portion thereof.

<Second Fluid>

The second fluid in the method for manufacturing aggregated resin particles according to the present invention contains at least an aggregating agent and/or an aggregation promoter. The second fluid may further contain a dispersion medium or compounds and resins etc. other than the aggregating agent and/or the aggregation promoter. The dispersion medium may be a liquid, a gas or a mixture thereof, buta liquid containing the aggregating agent and/or the aggregation promoter, namely containing a fluid component as a dispersion medium is preferred.

The second fluid generates an aggregate in which at least resin particles are aggregated or promotes aggregation upon contacting the first fluid by containing an aggregating agent and/or an aggregation promoter.

As a trigger for initiating the aggregation and/or its promotion, not only an aggregating agent but also hydrogen ion concentration (pH) is exemplified.

As the aggregation promoter, a pH adjuster which can adjust a hydrogen-ion concentration is preferably exemplified. For example, when an aggregating agent is contained in the first fluid and the second fluid is made low in hydrogen ion concentration by a pH adjuster, aggregates can be formed or aggregation can be promoted at a portion at which these fluids come into contact.

Also for example, when resin particles, a colorant, and a release agent, which are toner components, are contained in the first fluid and an aggregating agent is contained in the second fluid, aggregates are formed or aggregation is promoted at the portion at which these fluids come into contact.

Although the fluid component in the second fluid is not restricted in particular as long as it is a fluid that does not dissolve the resin particles and does not inhibit aggregation, a fluid that can dissolve the aggregating agent and/or the aggregation promoter is preferable, a fluid having a water based medium as a main component is more preferable, and a fluid having water as a main component is even more preferable. A surfactant may also be added as necessary.

The second fluid in the method for manufacturing aggregated resin particles according to the present invention may contain either one of an aggregating agent or an aggregation promoter or may contain both of an aggregating agent and an aggregation promoter. An aggregating agent and/or an aggregation promoter may be contained in only one type respectively, or may be contained in two or more types respectively.

As the aggregating agent, a charged compound having a valence of one or more is preferable, and specific examples include water-soluble surfactants, such as ionic surfactants, nonion-based surfactants, etc.; acids, such as hydrochloric acid, sulfuric acid, nitric acid, acetic acid, oxalic acid, etc.; metal salts of inorganic acids, such as aluminum chloride, magnesium chloride, sodium chloride, aluminum sulfate, calcium sulfate, ammonium sulfate, aluminum nitrate, silver nitrate, copper sulfate, sodium carbonate, etc.; metal salts of aliphatic acids and aromatic acids, such as sodium acetate, potassium formate, sodium oxalate, sodium phthalate, potassium salicylate, etc.; metal salts of phenols, such as sodium phenolate, etc.; metal salts of amino acids, etc.; inorganic acid salts of aliphatic and aromatic amines, such as triethanolamine hydrochloride, aniline hydrochloride, etc.

As the aggregating agent, metal salts of inorganic acids, such as aluminum chloride, magnesium chloride, sodium chloride, aluminum sulfate, calcium sulfate, ammonium sulfate, aluminum nitrate, silver nitrate, copper sulfate, sodium carbonate, etc.; and inorganic and organic metal salts, such as sodium acetate, potassium formate, sodium oxalate, sodium phthalate, potassium salicylate, etc.; are more preferable, and polyvalent inorganic metal salts, such as aluminum sulfate, aluminum nitrate, aluminum chloride, magnesium chloride, etc., are even more preferable and can be used favorably in terms of stability of the aggregated particles, stability of the aggregating agent against heat and elapse of time, removal during washing, etc.

In a case where an acidic metal salt, such as aluminum chloride, etc., is used as the aggregating agent in the second fluid, preferably, an acid, etc., is added to the first fluid to adjust the first fluid to be acidic. In a case where an acidic metal salt is used as the aggregating agent in the first fluid, the second fluid preferably contains an acid etc. as the aggregation promoter.

A content of the aggregating agent with respect to the second fluid is preferably no less than $1 \times 10^{-3}$% by weight and no more than 10% by weight. In this range, aggregation can be made to occur adequately and efficiency is provided.

The above pH adjuster is not particularly limited, and publicly known pH adjusters such as acid and/or alkali can be used.

Although depending on the concentrations of the respective fluids, a feed amount per unit time $V_1$ of the first fluid and a feed amount per unit time $V_2$ of the second fluid are preferably of a flow velocity ratio such that the feed amount per unit time of the second fluid is no less than 5 times and no more than 30 times the feed amount per unit time of the first fluid because aggregation can then be carried out efficiently.

In the present invention, both or either of the first fluid and the second fluid may have any of various additives added therein, and for example in the case of use in preparing an electrostatically charged image developing toner, a known internal additive, static controlling agent, inorganic particles, organic particles, lubricant, abrasive agent, etc., may be added.

In the method for manufacturing the aggregated resin particles according to the present invention, the shape of the obtained aggregated resin particles is not limited to spherical shape only. By arbitrary selecting aggregating agents and aggregation conditions such as heating temperature and heating time, it is possible to control the shape of the obtained aggregated resin particles to various shapes from spherical shape to amorphous shape.

The method for manufacturing the aggregated resin particles according to the present invention may include any known process besides the preparation step and the aggregation step.

For example, the method for manufacturing the aggregated resin particles according to the present invention preferably contains at least a step of heating the aggregated particles obtained by aggregating the above resin particles.

The heating conditions such as a heating temperature and a heating time for the obtained aggregated particles can be arbitrary selected depending on various materials such as resin particles used as a material or desired shape of the aggregated particles.

With the method for manufacturing aggregated resin particles according to the present invention, preferably, the microreactor includes a third flow channel merging into the confluent channel, and the method includes the step of introducing a third fluid, in which inorganic or organic particles are dispersed, into the third flow channel, and further aggregating inorganic or organic particles at least on outer sides of the aggregated resin particles obtained by aggregation of the resin particles.

The inorganic or organic particles are not restricted in particular as long as the particles are capable of aggregating, and the inorganic or organic particles are preferably all or anyone of external additive particles, the abovementioned resin particles and/or resin particles differing from the abovementioned resin particles.

When external additive particles are used as the inorganic or organic particles, particles with an additive added externally are obtained. When resin particles differing from the abovementioned resin particles are used as the inorganic or organic particles, core-shell particles can be obtained.

Known external additive particles in the field of toners can be cited as examples of the external additive particles. Specifically, inorganic particles of silica, alumina, titania, etc., and aliphatic acid metal salt particles of aluminum stearate, indium stearate, gallium stearate, zinc stearate, lithium stearate, magnesium stearate, sodium stearate, aluminum palmitate, aluminum oleate, etc., can be cited as favorable examples.

The above-described resin particles can be cited as favorable examples of the abovementioned resin particles and the resin particles differing from the abovementioned resin particles.

Figure 7:
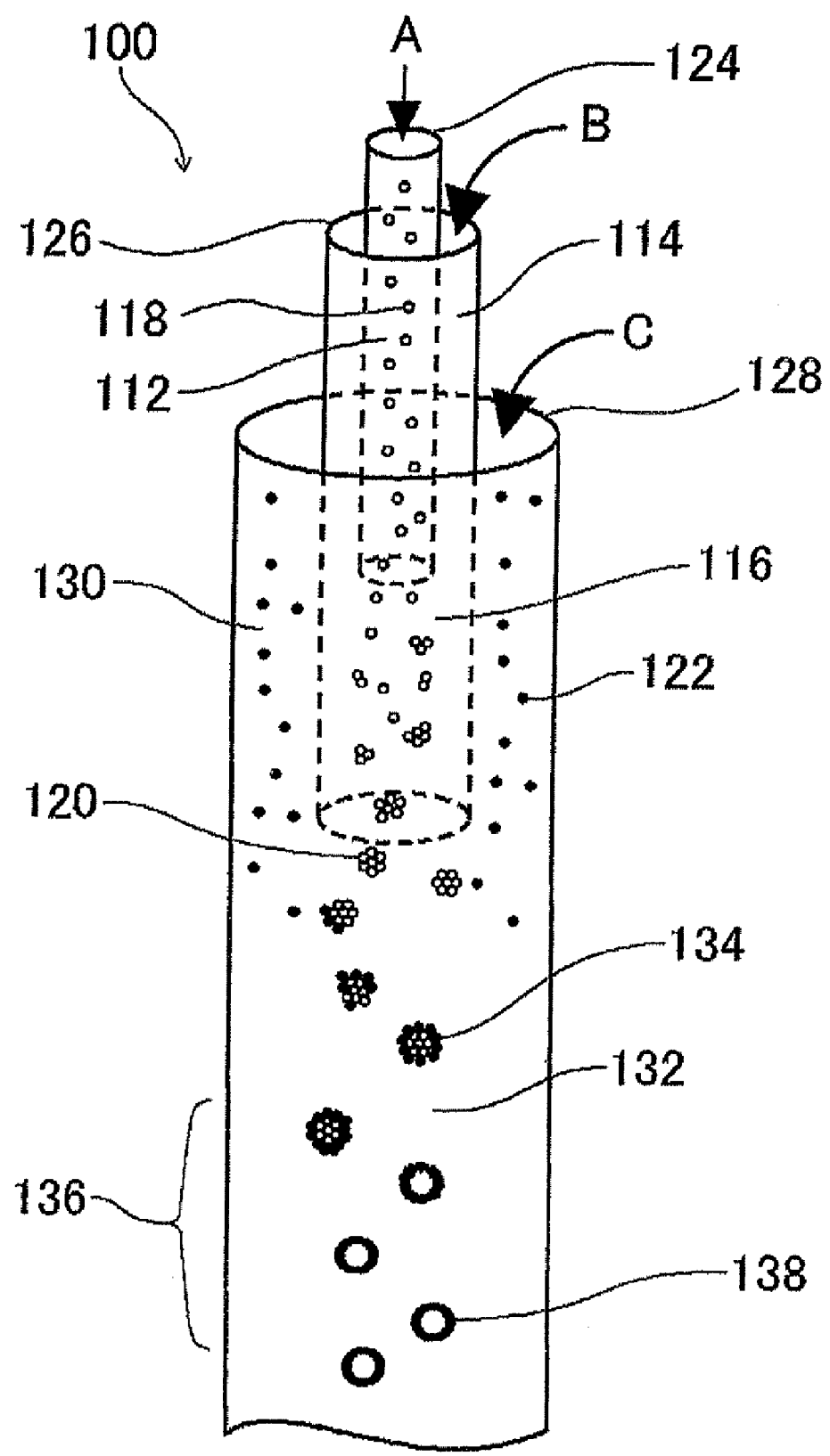
FIG. 7 is a schematic view of yet another exemplary example of a microreactor used in the method for manufacturing aggregated resin particles according to an aspect of the present invention.

The microreactor including the third flow channel merging into the confluent flow channel that can be used in the present invention is not restricted in particular and any of various microreactors can be used, and a microreactor such as shown in FIG. 7 can be cited as an example.

FIG. 7 is a schematic view of yet another example of a microreactor used in a method for manufacturing aggregated resin particles according to the present invention.

The microreactor 100 shown in FIG. 7 has a structure where a member 124 forming a first flow channel (first flow channel forming member) and a member 126 forming a second flow channel (second flow channel forming member) are disposed concentrically. The first flow channel forming member 124 forms a first flow channel 112, and at an outer periphery thereof, the second flow channel forming member 126 forms a second flow channel 114. The first flow channel forming member 124 has a length extending to an intermediate portion of the second flow channel forming member 126, and a confluent flow channel 116 is formed further downstream a tip of the first flow channel forming member 124. Furthermore, a third flow channel forming member 128 forms a third flow channel 113 at an outer periphery of the second flow channel forming member 126. The second flow channel forming member 126 has a length extending to an intermediate portion of the third flow channel forming member 128, and a confluent flow channel 132, into which the third flow channel merges, is formed further downstream a tip of the second flow channel forming member 126. The microreactor 100 shown in FIG. 7 has, in the confluent flow channel 132 into which the third flow channel merges, a region heated by a heater or other heating unit (not shown).

A first fluid A, containing resin particles 118, is fed into the first flow channel 112, a second fluid B, containing both or either of an aggregating agent and an aggregation promoter, is fed into the second flow channel, and a third fluid C, containing inorganic or organic particles 122, is fed into the third flow channel.

The first fluid A and the second fluid B merge in the confluent flow channel 116 and while forming a laminar flow, gradually diffuse into each other at the boundary region, the components including the resin particles 118 undergo aggregation due to both or either of the aggregating agent and the aggregation promoter, and aggregated resin particles A120 are formed. In the confluent flow channel 132, into which the third flow channel merges, inorganic or organic particles 122 aggregate further onto the aggregated resin particles A120, and aggregated resin particles B134 are formed. The formed aggregated resin particles B134 are fused in the heated region 136 and aggregated resin particles C138 are formed.

EXAMPLES

Although the present invention shall now be described more specifically by way of examples and comparative examples, the present invention is not limited to the following examples.

Coulter Counter TA-II (made by Beckman Coulter, Inc.) was used for average particle diameter measurement of particles. In this case, measurements were made using the optimal aperture according to the particle diameter level of the particles. The measured particle diameter is expressed as the volume average particle diameter.

In the case where the particle diameter of the particles was no more than approximately 5 μm, measurements were made with the laser diffraction scattering particle size distribution measuring device (LA-700, made by Horiba, Ltd.).

Furthermore, in the case where the particle diameter was of the nanometer order, measurements were made with the BET type specific surface area measuring device (Flow Sorb II 2300, made by Shimadzu Corp.).

The volume average primary particle diameter, the volume average particle size distribution index GSDv, and the number average particle size distribution index GSDp of the prepared aggregated particles were measured and computed as follows.

First, for particle size ranges (channels) into which a particle diameter distribution of toner measured using Coulter Counter TA-II (made by Beckman Coulter, Inc.) and Multisizer II (made by Beckman Coulter, Inc.) is partitioned, cumulative distributions for volume and number of individual particles are determined from the small diameter side, and particle diameters at a cumulative percentage of 16% are defined as a volume average particle diameter $D_{16v}$ and a number average particle diameter $D_{16P}$, and particle diameters at a cumulative percentage of 50% are defined as a volume average particle diameter $D_{50v}$ and a number average particle diameter $D_{50P}$. Likewise, particle diameters at a cumulative percentage of 84% are defined as a volume average particle diameter $D_{84v}$ and a number average particle diameter $D_{84P}$. Using these values, the volume average particle size distribution index (GSDv) and the number average particle size distribution index (GSDp) can be computed using the relationship formulae with which the volume average particle size distribution index (GSDv) is defined as $D_{84v}/D_{16v}$, and the number average particle size distribution index (GSDp) is defined as $D_{84P}/D_{16P}$.

The content of coarse particles among the particles was measured as follows.

From the volume average particle size distribution index data obtained by the above-described measurement of the particle size distribution indices, a content % of particles of particle diameter no less than a specific particle diameter (set to 15 μm in the examples described below) was computed as the content of coarse particles.

Example 1

Preparation of a Styrene-N-Butyl Acrylate Resin Particle Dispersion

| | |
|---|---|
| Styrene | 370 parts by weight |
| n-butyl acrylate | 30 parts by weight |
| Acrylic acid | 4 parts by weight |
| Dodecanethiol | 24 parts by weight |
| Carbon tetrachloride | 4 parts by weight |

In a flasks a product of mixing and dissolving the above components was dispersed and emulsified in a solution in which 6 parts by weight of a nonionic surfactant (Nonipol 400; manufactured by Sanyo Chemical Industries, Ltd.) and 10 parts by weight of an anionic surfactant (Neogen SC; manufactured by Dai-ichi Kogyo Seiyaku Co., Ltd.) were dissolved in 560 parts by weight of ion exchange water, and while mixing slowly for 10 minutes, 50 parts by weight of ion exchange water having 4 parts by weight of ammonium persulfate dissolved therein were charged into the flask, and after replacement by nitrogen, heating in an oil bath was performed while stirring the contents of the flask so that a temperature of the contents became 70° C., and emulsion polymerization was continued in this state for 5 hours. A resin particle dispersion (resin particle concentration: 30%), having resin particles, with a volume average particle diameter of 180 nm, a glass transition point of 55° C., a weight average molecular weight (Mw) of 15,800, and a specific density of 1.18, dispersed therein was thus prepared.

Preparation of the First Fluid (Fluid A1)

Dispersion Containing Resin Particles, Colorant, and Release Agent

Using the styrene-n-butyl acrylate resin particle dispersion prepared as described above, 86 parts by weight of the styrene-n-butyl acrylate resin particles with the volume average particle diameter of 180 nm, 5 parts by weight of copper phthalocyanine pigment (PV Fast Blue (made by BASF, Ltd.)), and 9 parts by weight of release agent particles (prepared by particulating Paraffin Wax HNP0190 (made by Nippon Seiro Co., Ltd.) by a Gaulin homogenizer to a particle diameter of approximately 200 nm) were dispersed in water to prepare a dispersion having a solids content of 5% by weight. The dispersion was adjusted to pH3 using nitric acid and thereby prepared as the first fluid (fluid A1).

Second Fluid (Fluid B1)

Fluid Containing Aggregating Agent

An aqueous solution containing 0.16% by weight of the aggregating agent, PAC (polyaluminum chloride), was prepared.

Manufacture of Aggregated Resin Particles

A microreactor was prepared by positioning a glass tube with an inner diameter of 1,000 µm and a fused silica capillary tube with an outer diameter of 350 µm and an inner diameter of 250 µm (tube, made by GL Sciences Inc.) so that the silica tube was disposed at a center of the glass tube as shown in FIG. 1 and combining liquid chromatography parts to enable the fluid A1 and the fluid B1 to be fed as shown in FIG. 1. The length of the silica tube inserted in the glass tube was made approximately 1 cm and the length of the glass tube was made approximately 20 cm. Syringe pumps were used as feeding pumps. A heater (not shown) was wound around a portion from 5 cm to 10 cm from an upper portion of the glass tube and heating to approximately 50° C. was performed. Feed rates into the microreactor were set to approximately 2 ml/h for the fluid A1 and approximately 50 ml/h for the fluid B1.

As a result, aggregated particles with a volume average particle diameter=approximately 5.7 µm and GSDv=1.4 were obtained in a continuous manner.

The content of coarse particles of no less than 15 µm in the aggregated resin particles obtained was 0.05%.

Example 2

Preparation of Amorphous Polyester Resin Particles

An amorphous polyester resin was synthesized by placing 35 parts by mol of polyoxyethylene (2,0)-2,2-bis(4-hydroxyphenyl)propane, 65 parts by mol of polyoxypropylene (2,2)-2,2-bis(4-hydroxyphenyl)propane, 80 parts by mol of terephthalic acid, 10 parts by mol of n-dodecenyl succinic acid, 10 parts by mol of isophthalic acid, and 0.05 parts by mol with respect to the acid components (total number of moles of the terephthalic acid, n-dodecenyl succinic acid, and isophthalic acid (100 parts by mol)) of dibutyltin oxide in a heat-dried flask, raising the temperature while maintaining an inert atmosphere by introducing nitrogen gas into the container and thereafter allowing co-condensation polymerization reaction to occur for approximately 12 hours at 150 to 230° C., and then depressurizing gradually at 210 to 250° C.

The weight average molecular weight (Mw) and the number average molecular weight (Mn) of the amorphous polyester resin obtained by molecular weight measurement by gel permeation chromatography (polystyrene equivalent molecular weights) were 15,400 and 6,800, respectively.

Upon measuring a DSC spectrum of the amorphous polyester resin by a differential scan calorimeter (DSC), a clear peak was not indicated and a step-like endothermic change was observed. A glass transition point determined as an intermediate point of the step-like endothermic change was 62° C.

A dispersion of amorphous polyester resin particles with a volume average particle diameter of 180 nm was prepared by dissolving 30 parts by weight of the amorphous polyester resin in 100 parts by weight of ethyl acetate, adding 1.5 parts by weight of an anionic surfactant (sodium dodecylbenzenesulfonate) along with 150 parts by weight of ion exchange water, heating to 60° C., stirring at 8,000 rpm by an emulsifier (Ultra Turrax T-50, made by IKA), and thereafter evaporating the ethyl acetate.

Preparation of the First Fluid (Fluid A2)

Dispersion Containing Resin Particles, Colorant, and Release Agent

Besides changing the styrene-n-butyl acrylate resin particle dispersion in Example 1 to the amorphous polyester resin particle dispersion obtained as described above, the same procedure was performed to obtain the first fluid (fluid A2)

Manufacture of Aggregated Resin Particles

Besides changing the first fluid (fluid A1) in Example 1 to the first fluid (fluid A2), the same procedure was performed.

As a result, aggregated particles with a volume average particle diameter=approximately 6.0 µm and GSDv=1.43 were obtained in a continuous manner.

The content of coarse particles of no less than 15 µm in the aggregated resin particles obtained was 0.1%.

Example 3

Manufacture of Aggregated Resin Particles

Using the apparatus 30 including the microreactor 40 shown in FIG. 2, the fluid A1 was set as the first fluid A in the tank 32 equipped with the pump P1, the fluid B1 was set as the second fluid B in the tank 34 equipped with the pump P2, and the fluids were fed into the inlet portions of the microreactor 40 made of glass. At the confluent flow channel 46, the heater 48 was wound around a portion extending from 5 to 20 cm from an end of the merging portion and heating to approximately 50° C. was performed. The respective flow channels 42, 44, and 46 in the microreactor 40 were rectangular flow channels, the flow channel diameter $L^1$ of the first flow channel 42 was 300 µm, the flow channel diameter $L^2$ of the second flow channel 44 was 300 µm, the flow channel diameter $L^3$ of the confluent flow channel was 500 µm, and the depth of the respective flow channels 42, 44, and 46 was 300 µm. The total length of the confluent flow channel 46, including portions other than the interior of the microreactor 40, was 30 cm. The feed rate into the microreactor was 5 ml/h for the fluid A1 and 45 ml/h for the fluid B1.

As a result, aggregated particles with a volume average particle diameter=approximately 6.0 µm and GSDv=1.45 were obtained in a continuous manner.

The content of coarse particles of no less than 15 µm in the aggregated resin particles obtained was 0.1%.

Example 4

Preparation of Amorphous Polyester Resin Particles

An amorphous polyester resin was synthesized by placing 35 parts by mol of polyoxyethylene (2,0)-2,2-bis(4-hydroxyphenyl)propane, 65 parts by mol of polyoxyethylene (2,2)-2,2-bis(4-hydroxyphenyl)propane, 80 parts by mol of terephthalic acid, 10 parts by mol of n-dodecenyl succinic acid, 10 parts by mol of isophthalic acid, and 0.05 parts by mol with respect to the acid components (total number of moles of the terephthalic acid, n-dodecenyl succinic acid, and isophthalic acid) of dibutyltin oxide in a heat-dried flask, raising the temperature while maintaining an inert atmosphere by introducing nitrogen gas into the container and thereafter allowing co-condensation polymerization reaction to occur for approximately 12 hours at 150 to 230° C., and then depressurizing gradually at 210 to 250° C. The weight average molecular weight (Mw) and the number average molecular weight (Mn) of the amorphous polyester resin obtained by molecular weight measurement by gel permeation chromatography (polystyrene equivalent molecular weights) were 15,400 and 6,800, respectively.

Upon measuring the DSC spectrum of the amorphous polyester resin by the differential scan calorimeter (DSC), a clear peak was not indicated and a step-like endothermic change was observed. The glass transition point determined as the intermediate point of the step-like endothermic change was 62° C.

An amorphous polyester resin particle dispersion with a volume average particle diameter of 180 nm was prepared by dissolving 30 parts by weight of the amorphous polyester resin in 100 parts by weight of ethyl acetate, adding 1.5 parts by weight of an anionic surfactant (sodium dodecylbenzenesulfonate) along with 150 parts by weight of ion exchange water, heating to 60° C., stirring at 8,000 rpm by an emulsifier (Ultra Turrax T-50, made by IKA), and thereafter evaporating the ethyl acetate.

Preparation of the First Fluid (Fluid A3)

Dispersion Containing Resin Particles, Colorant, and Release Agent

Besides changing the styrene-n-butyl acrylate resin particle dispersion in Example 1 to the amorphous polyester resin particle dispersion obtained as described above and furthermore adding 0.16% by weight of the aggregating agent PAC (polyaluminum chloride), and adjusting to pH=7 by nitric acid, the same procedure was performed to obtain the first fluid (fluid A3)

Example 5

Manufacture of Aggregated Resin Particles

Besides changing the first fluid (fluid A1) in Example 1 to the first fluid (fluid A3) and using ion exchange water adjusted to pH=3 by nitric acid (fluid B2) in place of the fluid B1 as the second fluid, the same procedure was performed.

As a result, aggregated resin particles with a volume average particle diameter=approximately 6.0 μm and GSDv-1.43 were obtained in a continuous manner.

The content of coarse particles of no less than 15 μm in the aggregated resin particles obtained was 0.1%.

Manufacture of Aggregated Resin Particles

Using the apparatus 30 including the microreactor 40 shown in FIG. 2, the fluid A3 was set as the first fluid in the tank 32 equipped with the pump P1, the fluid B2 was set as the second fluid in the tank 34 equipped with the pump P2, and the fluids were fed into the inlet portions of the microreactor 40 made of glass. At the confluent flow channel 46, the heater 48 was wound around a portion extending from 5 to 20 cm from an end of the merging portion and heating to approximately 50° C. was performed. The respective flow channels 42, 44, and 46 in the microreactor 40 were rectangular flow channels, the flow channel diameter $L^1$ of the first flow channel 42 was 300 μm, the flow channel diameter $L^2$ of the second flow channel 44 was 300 μm, the flow channel diameter $L^3$ of the confluent flow channel was 500 μm, and the depth of the respective flow channels 42, 44, and 46 was 300 μm. The total length of the confluent flow channel 46, including portions other than the interior of the microreactor 40, was 30 cm. The feed rate into the microreactor was 5 ml/h for the fluid A3 and 45 ml/h for the fluid B2.

As a result, aggregated particles with a volume average particle diameter=approximately 6.0 μm and GSDv=1.45 were obtained in a continuous manner.

The content of coarse particles of no less than 15 μm in the aggregated resin particles obtained was 0.1%.

Example 6

A microreactor was prepared by positioning a glass tube with an inner diameter of 500 μm and a fused silica capillary tube with an outer diameter of 350 μm and an inner diameter of 250 μm (tube, made by GS Sciences Inc.) so that the silica tube was disposed at a center of the glass tube as shown in FIG. 7, positioning a glass tube with an inner diameter of 1000 μm outside these tubes, and combining liquid chromatography parts to enable the fluid A1 (the first fluid), the fluid B1 (the second fluid), and a fluid C1 (the third fluid) to be fed respectively as shown in FIG. 7. The length of the silica tube inserted in the glass tube was set to approximately 1 cm and the length of the glass tube was set to approximately 20 cm. A syringe pump was used as a feeding pump. A heater (not shown) was wound around an interval from 5 cm to 10 cm from an upper portion of the glass tube and heating to approximately 90° C. was performed. Feed amounts into the microreactor were set to approximately 2 ml/h for the fluid A1, approximately 50 ml/h for the fluid B1, and approximately 100 ml/h for the fluid C1. Here, as the fluid C1, 20 parts by weight of the styrene-n-butyl acrylate resin particle dispersion were dispersed in water to prepare a dispersion having a solids content of 5% by weight.

As a result, aggregated particles with a volume average particle diameter=approximately 6.5 μm and GSDv=1.4 were obtained in a continuous manner. In SEM observation of the particles obtained, the interiors of the particles were observed to be coalesced and to have hardly any vacancies.

The content of coarse particles of no less than 15 μm in the aggregated resin particles obtained was 0.05%.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A method for manufacturing aggregated resin particles, comprising:
    preparing a microreactor that includes, in a contained configuration: a first flow channel, a second flow channel, a confluent flow channel, to which the first flow channel and the second flow channel merge, and a third flow channel that merges into the confluent channel, wherein the first flow channel is disposed concentrically in an interior of the second flow channel;

introducing a first fluid that contains resin particles dispersed therein into the first flow channel;

introducing a second fluid into the second flow channel;

feeding the first and second fluids so that a feed amount per unit time of the second fluid is greater than a feed amount per unit time of the first fluid, so as to form a laminar flow, in which the first fluid and the second fluid are merged, in the confluent flow channel;

forming first aggregated resin particles by aggregating the resin particles while the first fluid and the second fluid are merged in laminar flow;

introducing a third fluid into the third flow channel, wherein the third fluid contains inorganic or organic particles dispersed therein and a feed amount per unit time of the third fluid is greater than a feed amount per unit time of the second fluid, in which the third fluid and the merged first fluid and second fluid are merged, in the confluent flow channel;

aggregating the inorganic or organic particles on outer sides of the first aggregated resin particles to form second aggregated resin particles while the third fluid and the merged first fluid and second fluid are merged; and heating the second aggregated resin particles, wherein one of the first fluid and the second fluid contains a larger amount of an aggregating agent and/or an aggregating promoter than the other fluid.

2. The method according to claim 1,
wherein the feed amount per unit time of the second fluid is no less than 5 times and no more than 30 times the feed amount per unit time of the first fluid.

3. The method according to claim 1,
wherein the first aggregated resin particles have a volume average particle diameter of no less than 1 μm and no more than 15 μm.

4. The method according to claim 1,
wherein the first fluid further contains a colorant and a release agent.

5. The method according to claim 1,
wherein the inorganic or organic particles are an external additive.

6. The method according to claim 1, wherein the method is a continuous method.

* * * * *